(12) United States Patent
Tang et al.

(10) Patent No.: US 11,451,651 B2
(45) Date of Patent: Sep. 20, 2022

(54) DISPLAY ASSEMBLY OF ELECTRONIC DEVICE AND ELECTRONIC DEVICE

(71) Applicant: GUANGDONG OPPO MOBILE TELECOMMUNICATIONS CORP., LTD., Guangdong (CN)

(72) Inventors: Yimei Tang, Guangdong (CN); Jiao Cheng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 46 days.

(21) Appl. No.: 17/115,233

(22) Filed: Dec. 8, 2020

(65) Prior Publication Data
US 2021/0092211 A1    Mar. 25, 2021

Related U.S. Application Data

(63) Continuation of application No. PCT/CN2018/091015, filed on Jun. 13, 2018.

(51) Int. Cl.
*H04M 1/02* (2006.01)
*G02F 1/13357* (2006.01)
(Continued)

(52) U.S. Cl.
CPC ........ *H04M 1/0266* (2013.01); *G02F 1/1339* (2013.01); *G02F 1/1368* (2013.01);
(Continued)

(58) Field of Classification Search
CPC .... H04M 1/02; H04M 1/0264; H04M 1/0266; H04M 2250/52; G02F 1/133602;
(Continued)

(56) References Cited

U.S. PATENT DOCUMENTS 10,267,976 B1 * 4/2019 Zheng ................. G02B 6/0045
2013/0077017 A1 * 3/2013 Aoki ................. G02F 1/133308
349/58
(Continued)

FOREIGN PATENT DOCUMENTS

CN    105431753 A    3/2016
CN    105743626 A    7/2016
(Continued)

OTHER PUBLICATIONS

Chinese First Office with English Translation for CN Application 201880092651.4 dated Dec. 7, 2021. (18 pages).
(Continued)

*Primary Examiner* — Hoan C Nguyen
(74) *Attorney, Agent, or Firm* — Young Basile Hanlon & MacFarlane, P.C.

(57) ABSTRACT

A display assembly of an electronic device and the electronic device are provided. The electronic device further includes a display assembly and a camera module. The display assembly includes a cover plate, a display panel, and a backlight module that are sequentially stacked together. A display region of the display panel defines a first mounting through hole. The backlight module defines a second mounting through hole aligned with the first mounting through hole. The second mounting through hole is configured to position the camera module. The first mounting through hole is a channel through which external light passing through the cover plate enters the camera module.

17 Claims, 9 Drawing Sheets

(51) Int. Cl.
*G02F 1/1339* (2006.01)
*G02F 1/1362* (2006.01)
*G02F 1/1368* (2006.01)

(52) U.S. Cl.
CPC .. *G02F 1/133602* (2013.01); *G02F 1/136209* (2013.01); *H04M 1/0264* (2013.01); *G02F 1/136222* (2021.01); *H04M 2250/52* (2013.01)

(58) Field of Classification Search
CPC .. G02F 1/1368; G02F 1/13312; G02F 1/1333; G02F 1/1339; G02F 1/133608; G02F 1/136209; G02F 1/133308; G02F 1/136222; G02F 2201/56
See application file for complete search history.

(56) References Cited

U.S. PATENT DOCUMENTS

| | | | | |
|---|---|---|---|---|
| 2015/0155903 | A1* | 6/2015 | Jang | H04M 1/72403 455/575.8 |
| 2016/0161664 | A1 | 6/2016 | Ishida et al. | |
| 2017/0068287 | A1* | 3/2017 | Jung | G02B 1/111 |
| 2019/0072822 | A1 | 3/2019 | Yasunaga et al. | |
| 2020/0117034 | A1* | 4/2020 | Yin | G06F 1/169 |
| 2021/0333633 | A1* | 10/2021 | Mei | G03B 15/02 |

FOREIGN PATENT DOCUMENTS

| | | | | |
|---|---|---|---|---|
| CN | 106506742 | A | 3/2017 | |
| CN | 106843389 | A | 6/2017 | |
| CN | 106850897 | A | 6/2017 | |
| CN | 106935144 | A | 7/2017 | |
| CN | 107067971 | A | 8/2017 | |
| CN | 107144995 | A | 9/2017 | |
| CN | 107229148 | A | 10/2017 | |
| CN | 107331314 | A | 11/2017 | |
| CN | 107395928 | A | 11/2017 | |
| CN | 107707695 | A | 2/2018 | |
| CN | 107872611 | A | 4/2018 | |
| EP | 3547019 | A1 | 10/2019 | |
| JP | H05173183 | A * | 7/1993 | |
| WO | WO-2011080952 | A1 * | 7/2011 | ............... G02B 7/02 |
| WO | 2018083244 | A1 | 5/2018 | |

OTHER PUBLICATIONS

Extended European Search Report for EP Application 18922403.3 dated Mar. 29, 2021. (37 pages).
Vivo, "Remaining issues on simultaneous reception of DL/UL physical channels and reference signals." 3GPP TSG RAN WG1 Meeting #93, R1-1806047, dated May 12, 2018.
International search report with English Translation issued in corresponding international application No. PCT/CN2018/090762 dated Feb. 25, 2019.
International search report with English Translation issued in corresponding international application No. PCT/CN2018/091015 dated Mar. 14, 2019.
Chinese Second Office Action with English Translation for CN Application 201880092651.4 dated Apr. 26, 2022. (13 pages).

* cited by examiner

DISPLAY ASSEMBLY OF ELECTRONIC DEVICE AND ELECTRONIC DEVICE

CROSS-REFERENCE TO RELATED APPLICATION(S)

This application is a continuation of International Application No. PCT/CN2018/091015, filed on Jun. 13, 2018, the entire disclosure of which is hereby incorporated by reference in its entirety.

TECHNICAL FIELD

This disclosure relates to the technical field of electronic products, and particularly to a display assembly of an electronic device and an electronic device.

BACKGROUND

Electronic devices with a high screen-to-body ratio may generally have a large display area, so as to provide good experience for users. At present, mainstream manufacturers are conducting research and development to improve the screen-to-body ratio of the electronic device.

SUMMARY

Implementations of the disclosure provide a display assembly of an electronic device and an electronic device including the display assembly.

A display assembly of an electronic device is provided. The electronic device further includes a camera module. The display assembly includes a cover plate, a display panel, and a backlight module that are sequentially stacked together. The display panel has a display region and the display region defines a first mounting through hole. The backlight module defines a second mounting through hole aligned with the first mounting through hole. The second mounting through hole is configured to position the camera module. The first mounting through hole serves as a channel through which external light passing through the cover plate enters the camera module.

A display assembly of an electronic device is provided. The electronic device further includes a camera module. The display assembly includes a cover plate, a display panel, and a backlight module that are sequentially stacked together. The cover plate has a display region and the display region is configured to allow light from the display panel to pass through to present a picture. The display panel defines a first mounting through hole, and a projection of the first mounting through hole on a axial direction of the first mounting through hole falls within the display region. The backlight module defines a second mounting through hole aligned with the first mounting through hole, the second mounting through hole is configured to receive and position the camera module, and the first mounting through hole is configured to allow external light passing through the display region to enter the camera module.

An electronic device is provided. The electronic device includes a camera module and a display assembly. The display assembly includes a cover plate, a display panel, and a backlight module that are sequentially stacked together. The display panel has a display region and the display region defines a first mounting through hole, and the backlight module defines a second mounting through hole aligned with the first mounting through hole. The camera module is inserted in the second mounting through hole, enabling external light to pass through the cover plate and the first mounting through hole to enter the camera module, where the second mounting through hole is configured to position the camera module.

BRIEF DESCRIPTION OF THE DRAWINGS

To describe the technical solutions of the implementations more clearly, the following will give a brief description of accompanying drawings used for describing the implementations. Apparently, the accompanying drawings described in the following are merely some implementations. Those of ordinary skill in the art can also obtain other accompanying drawings based on the accompanying drawings described below without creative efforts.

DETAILED DESCRIPTION

Technical solutions in implementations of the disclosure will be described clearly and completely hereinafter with reference to the accompanying drawings in the implementations. Apparently, the described implementations are merely some rather than all implementations. All other implementations obtained by those of ordinary skill in the art based on the implementations without creative efforts shall fall within the protection scope.

A display screen of an electronic device is provided according to an implementation of the present disclosure. The electronic device includes, but is not limited to, a mobile phone, a tablet computer, a wearable device, or the like. The electronic device further includes a camera module.

Figure 1:
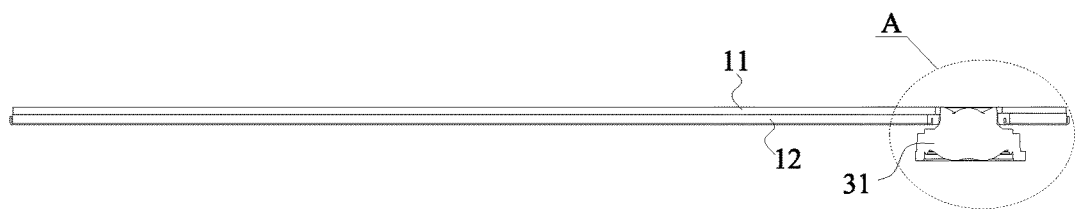
FIG. 1 is a cross-sectional view of a display screen according to implementations.
Figure 2:
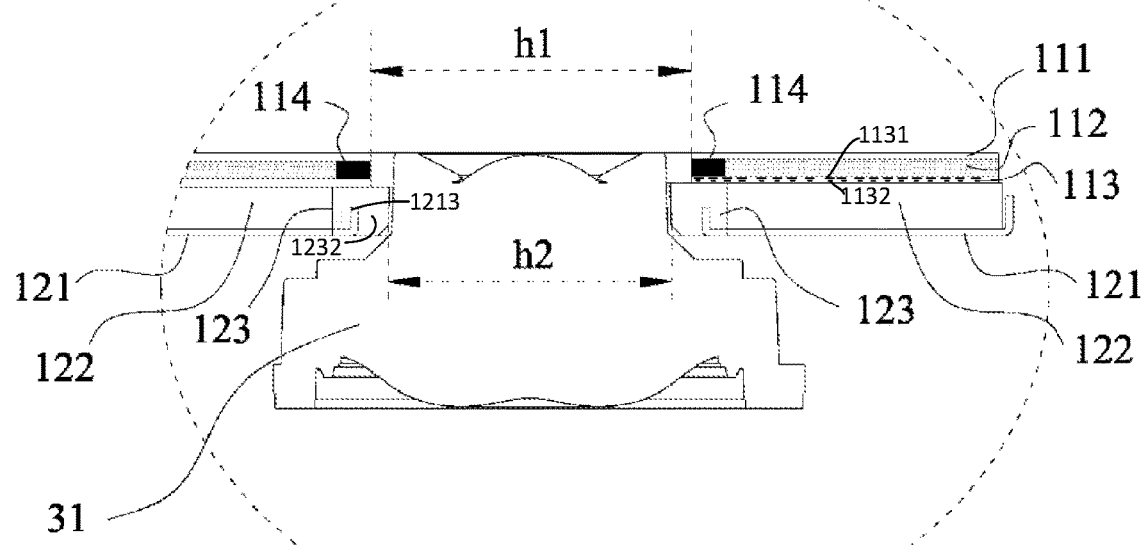
FIG. 2 is an enlarged view of part A of the display screen illustrated in FIG. 1.

As illustrated in FIG. 1 and FIG. 2, the display screen 10 includes a display panel 11 and a backlight module 12 that are stacked together. The display panel 11 is configured to display pictures, and the backlight module 12 is configured to provide backlight for the display panel 11. The display panel 11 has a display region (that is, a region in which pixels are arranged) for picture display, and the display region can allow light to pass through. The display panel 11 further has a non-display region in which a driving circuit(s) can be arranged. The display region of the display panel 11 defines a first mounting through hole h1. The backlight module 12 defines a second mounting through hole h2. The second mounting through hole h2 is aligned with the first mounting through hole h1. In one example, the second mounting through hole h2 being aligned with the first mounting through hole h1 refers to that an axis of the second mounting through hole h2 coincides with that of the first mounting through hole h1. Alternatively, the second mounting through hole h2 being aligned with the first mounting through hole h1 refers to that there is a slight deviation between the axis of the second mounting through hole h2 and the axis of the first mounting through hole h1. The second mounting through hole h2 is configured to position a camera module 31. That is, the camera module 31 is inserted in the second mounting through hole h2, and a hole wall of the second mounting through hole h2 cooperates with the camera module 31 to position the camera module 31. The first mounting through hole h1 serves as a channel through which external light can enter the camera module 31. That is, the external light can pass through the display region, the first mounting through hole h1, and the second mounting through hole h2, and finally enter the camera module 31. The camera module 31 can form an image after collecting the external light.

In the related art, the camera module 31 and the display panel 11 are arranged side by side, and the camera module 31 is arranged at the outside of the display panel 11 (certainly, arranged at the outside of the non-display region of the display panel 11). Under a condition that an area of a display surface (a surface on which pictures are displayed) of the electronic device 30 keeps unchanged, since the camera module 31 occupies part of the display surface, an area of part of the display surface occupied by the display panel 11 is limited, and thus an area of the display region of the display panel 11 is accordingly limited, so that a screen-to-body ratio of the electronic device 30 is relatively small. In contrast, in the solution provided herein, since the camera module 31 is arranged in a region corresponding to the display region of the display panel 11, the display panel 11 can be extended to a position in which a camera is arranged in the related art, such that a ratio of an area of the display panel 11 to an area of the display surface can be increased, thereby increasing the screen-to-body ratio of the display panel 11. The above is similar to a scenario in which a feature phone is replaced with a smart phone with a touch screen, since the "keyboard" of the smart phone is arranged in the display region of the smart phone (i.e., a key function is realized through touch in the display region), the display panel 11 can be extended to a position in which the keyboard of the feature phone is arranged, such that the screen-to-body ratio of the smart phone is larger than that of the feature phone. In addition, by using the backlight module 12 to position the camera module 31, without a complicated positioning structure, the camera module 31 can be effectively positioned with a component of the display screen 10.

In at least one implementation, the second mounting through hole h2 has a smaller aperture than the first mounting through hole h1. Therefore, the second mounting through hole h2 can be used for position limiting. In addition, it is beneficial for ensuring that the display panel 11 (as a key component) is far away from the camera module 31 to protect the display panel 11, for example, the display panel 11 can be prevented from being scraped by the camera module 31 during assembly.

In at least one implementation, as illustrated in FIG. 2, the display panel 11 may be a liquid crystal 112 panel. The liquid crystal 112 panel includes a color filter substrate 111 and a thin film transistor (TFT) substrate 113. The first mounting through hole h1 has openings respectively defined on both the color filter substrate 111 and the TFT substrate 113. A sealing barrel 114 is disposed between the opening defined on the color filter substrate 111 and the opening defined on the TFT substrate 113, so as to enable the liquid crystal 112 to be sealed in a sealed cavity formed by the color filter substrate 111, the TFT substrate 113, and the sealing barrel 114. An inner wall of the sealing barrel 114 is a hole wall of the first mounting through hole h1. With aid of the sealing barrel 114, the liquid crystal 112 is not easy to leak out when the liquid crystal 112 panel defines the through hole, thereby ensuring the display performance. The sealing barrel 114 may be formed during manufacturing of the liquid crystal 112 panel.

In at least one implementation, the sealing barrel 114 may be a first black matrix of the liquid crystal 112 panel. That is to say, the sealing barrel 114 is made of a black matrix material (including but not limited to black photoresist film), is manufactured with a black matrix process, and has the function of the black matrix (preventing light leakage among pixels and increasing contrast). It can be understood that in other implementations the display panel 11 is not limited to the liquid crystal 112 panel, and the sealing barrel 114 may also be made of other materials and manufactured with other processes.

In at least one implementation, wirings 1132 (including but not limited to a gate line(s)) are formed on the TFT substrate 113, and a second black matrix 1131 for covering (hiding) the wirings 1132 is also formed on the TFT substrate 113. In the related art, a black matrix for covering the wirings 1132 on the TFT substrate is generally formed on the color filter substrate. When the color filter substrate is aligned with the TFT substrate, to enable the black matrix on the color filter substrate to accurately cover the wirings 1132 on the TFT substrate, the black matrix on the color filter substrate needs to be designed to be relatively wide, which may affect the display of the liquid crystal panel. In contrast, according to implementations, since the second black matrix 1131 is formed on the TFT substrate 113, what is needed is to align the color filter substrate with the TFT substrate, and there is no need to consider whether the alignment between the color filter substrate and the TFT substrate may affect that the second black matrix 1131 covers the wirings 1132 on the TFT substrate (since the second black matrix 1131 always covers the wirings 1132 on the TFT substrate). As a result, the second black matrix 1131 can be designed to be relatively narrow, so as to reduce the influence on the display of the liquid crystal panel.

Figure 3:
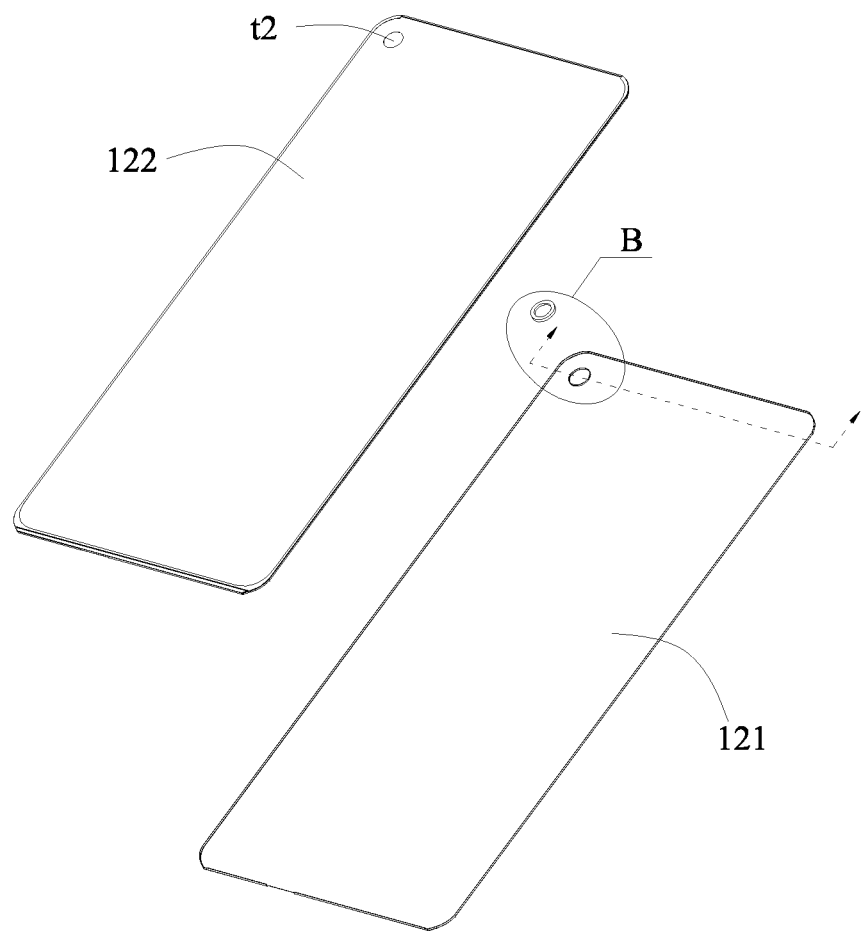
FIG. 3 is an exploded view of a backlight module in FIG. 1.
Figure 4:
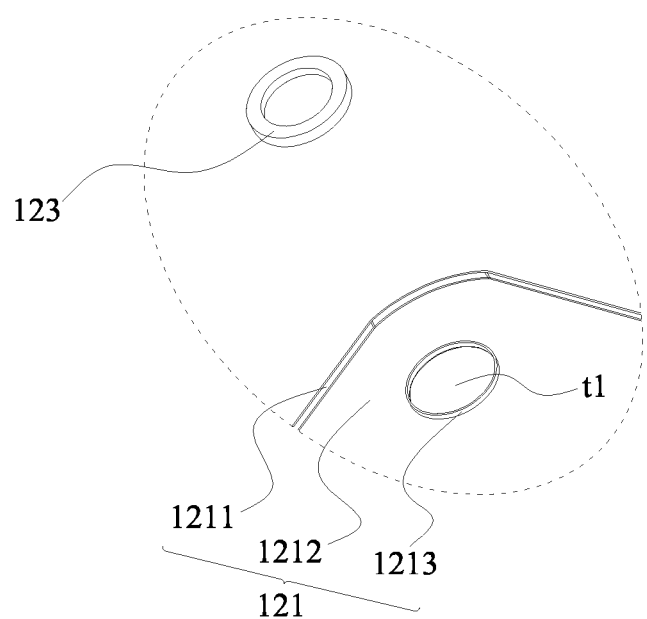
FIG. 4 is an enlarged view of part B of the backlight module in FIG. 3.

In a first implementation, as illustrated in FIG. 2 to FIG. 4, the backlight module 12 may include a metal bottom cover 121. The second mounting through hole h2 has an opening defined on the metal bottom cover 121. A first folded edge 1213 is formed on the periphery of the opening defined on the metal bottom cover 121. The first folded edge 1213 protrudes from (for example, is perpendicular to) a surface in which the opening defined on the metal bottom cover 121 locates. The first folded edge 1213 can be formed by sheet metal processing. Alternatively, the first folded edge 1213 can be separately manufactured and then connected to the opening defined on the metal bottom cover 121 (by means of a manner including but not limited to riveting or welding). The first folded edge 1213 may be a closed ring to surround the opening defined on the metal bottom cover 121. Alternatively, the first folded edge 1213 may be an open ring connected to a part of an edge line of the opening defined on the metal bottom cover 121. The first folded edge 1213 serves as the hole wall of the second mounting through hole h2, that is to say, the first folded edge 1213 can be used to position the camera module 31, so as to effectively position the camera module 31 without a complicated positioning structure.

As illustrated in FIG. 2 to FIG. 4, compared with the first implementation, in a second implementation, the backlight module 12 may further include a plastic sleeve 123, and the plastic sleeve 123 is connected to the first folded edge 1213. The plastic sleeve 123 defines an open hole, and the open hole of the plastic sleeve 123 is aligned with a first through hole t1 (that is, the opening defined on the metal bottom cover 121). The open hole of the plastic sleeve 123 serves as the second mounting through hole h2. In other words, the plastic sleeve 123 can be used to position the camera module 31, thereby realizing the effective positioning of the camera module 31. Since the plastic sleeve 123 is manufactured by a plastic molding process, the plastic sleeve 123 has high size accuracy, which is helpful for reducing the assembly tolerance between the plastic sleeve 123 and the camera module 31 and enhancing the assembly strength of the camera module 31.

According to implementations, the plastic sleeve 123 may be attached to a hole wall of the first through hole t1 to be received in the first through hole t1. In this case, the first folded edge 1213 is arranged at the outside of the plastic sleeve 123. Alternatively, the plastic sleeve 123 can be inserted in and connected to the first folded edge 1213, that is, the first folded edge 1213 is embedded in a side wall 1232 of the plastic sleeve 123 to form a fixed connection between the plastic sleeve 123 and the first folded edge 1213. In this way, the connection strength of the plastic sleeve 123 can be enhanced, thereby facilitating the position limiting of the camera module 31. In addition, the alignment between the open hole of the plastic sleeve 123 and the first through hole t1 has the same meaning as the above-described alignment between the second mounting through hole h2 and the first mounting through hole h1, which will not be repeated herein.

In at least one implementation, as illustrated in FIG. 2 to FIG. 4, the metal bottom cover 121 may include a cover body 1212. A second folded edge 1211 is formed on the periphery of the cover body 1212. The second folded edge 1211 protrudes from (for example, is perpendicular to) the cover body 1212. The second folded edge 1211 can be formed by sheet metal processing. Alternatively, the second folded edge 1211 can be separately manufactured and then connected to cover body 1212 (by means of a manner including but not limited to riveting or welding). The second folded edge 1211 may be a closed ring to surround the cover body 1212. Alternatively, the second folded edge 1211 may be an open ring connected to a part of an edge line of the cover body 1212. The backlight module 12 further includes an optical component(s) 122 (including but not limited to, a light guide plate, a reflective sheet, an antireflection film, and the like). The optical component 122 is disposed between the cover body 1212 and the display panel 11. The optical component 122 defines a second through hole t2. The first folded edge 1213 is inserted in the second through hole t2. That is, the second through hole t2 has a larger aperture than the first through hole t1, so that a hole wall of the second through hole t2 surrounds the periphery of the first folded edge 1213. The second folded edge 1211 is arranged around the periphery of the optical component 122 to receive and protect the optical component 122.

In at least one implementation, the optical component 122 includes a light guide plate 1221. The light guide plate 1221 is configured to receive light of a light source and provide uniform surface light to the display panel 11.

Figure 5:
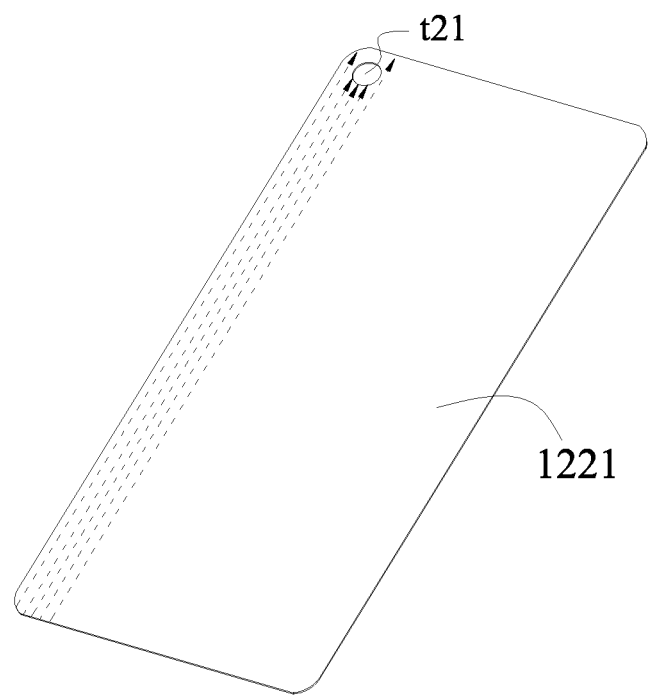
FIG. 5 is a schematic view illustrating a light propagation path in a light guide plate according to implementations.

In at least one implementation, as illustrated in FIG. 3 and FIG. 5, the second through hole t2 has an opening t21 at an edge line of the light guide plate 1221. FIG. 5 is a schematic view illustrating a transmission path of light from the light source in the light guide plate 1221, where a dashed arrow represents an incident light path of the light source, and a light-emitting surface of the light guide plate 1221 is a surface facing an observer. According to implementations, light traveling to one side of the opening t21 cannot be transmitted to the other side of the opening t21 due to lack of a transmission medium. As a result, a surface light cannot be generated at the other side of the opening t21, and thus a corresponding region of the display panel 11 cannot be used for display. However, since the opening t21 of the second through hole t2 defined on the light guide plate 1221 locates at the edge line of the light guide plate 1221, and a region at the other side of the opening t21 where the surface light cannot be generated is extremely small, such that the region of the display panel 11 that cannot be used for display is also extremely small. Therefore, with such configuration, it can avoid the adverse influence of the opening defined on the light guide plate 1221 on the display of the display panel 11 as much as possible.

Figure 6:
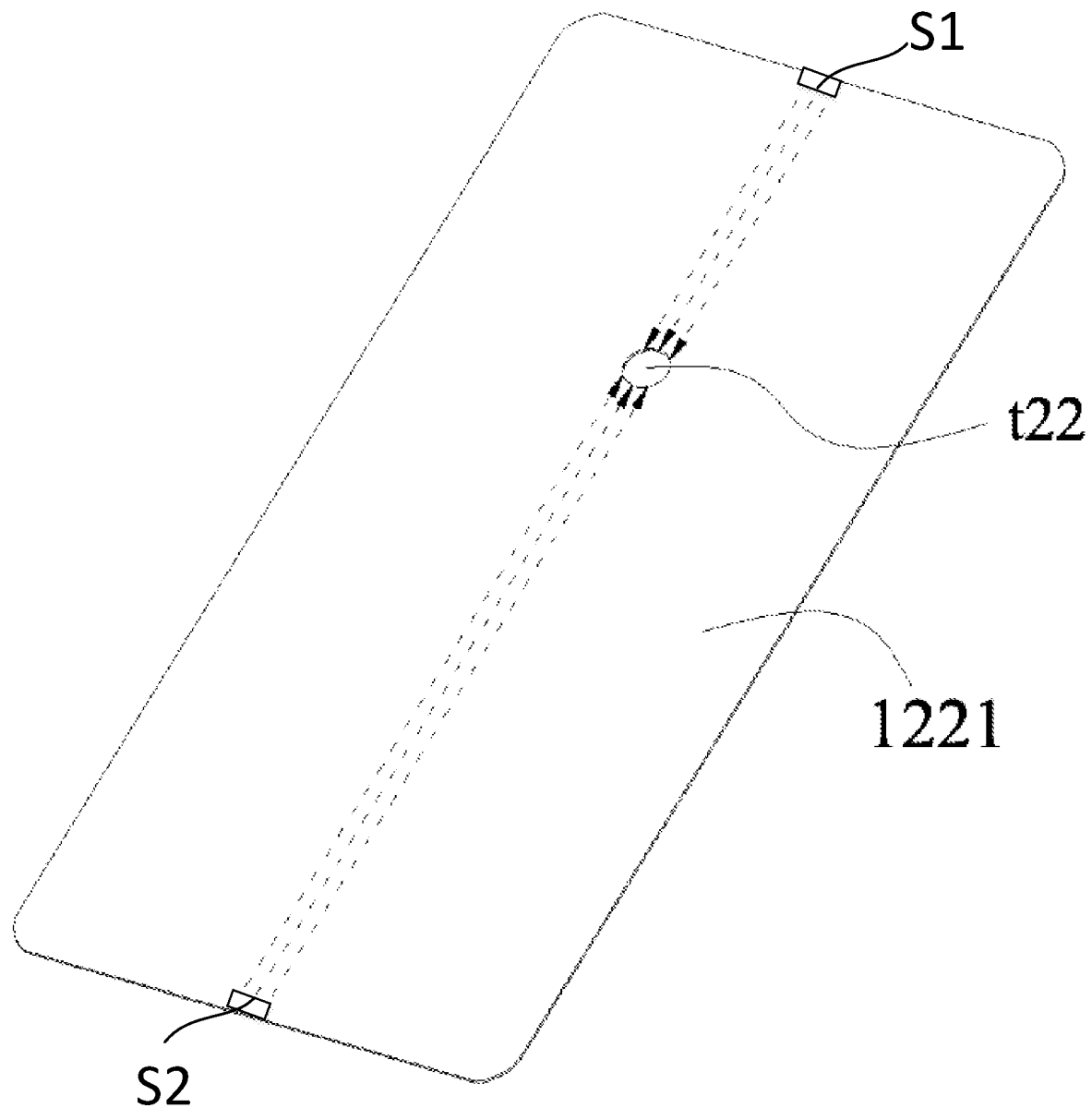
FIG. 6 is a schematic view illustrating a light propagation path in the light guide plate according to other implementations.

Alternatively, different from above implementations, as illustrated in FIG. 6, in another implementation, the backlight module 12 includes a first light source S1 and a second light source S2. The first light source S1 and the second light source S2 are respectively disposed at two opposite sides of an opening t22 of the second through hole t2 defined on the light guide plate 1221, so as to provide incident light to the light guide plate 1221 in opposite directions. The first light source S1 and the second light source S2 can cooperate with each other, so that surface lights can be generated at the two sides of the opening t22 defined on the light guide plate 1221, thereby remedying the defect that the corresponding region of the display panel 11 cannot be used for display in the above implementations. According to this implementation, the opening t22 on the light guide plate 1221 may be defined at any position as required, for example, may also be defined at the edge line of the light guide plate 1221 or may be defined at a middle position of the light guide plate 1221. The second folded edge 1211 is arranged around the periphery of the first light source S1 and the second light source S2, to receive and protect the first light source S1 and the second light source S2.

Figure 7:
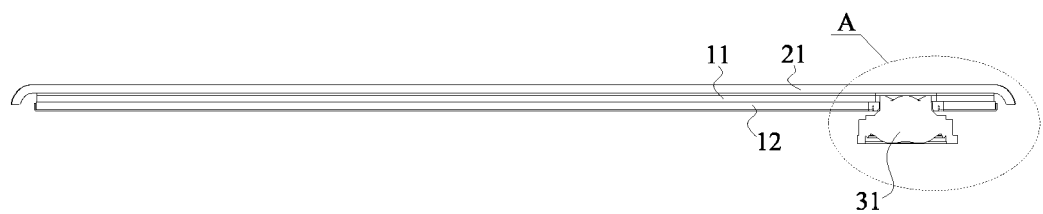
FIG. 7 is a cross-sectional view of a display assembly according to implementations.
Figure 8:
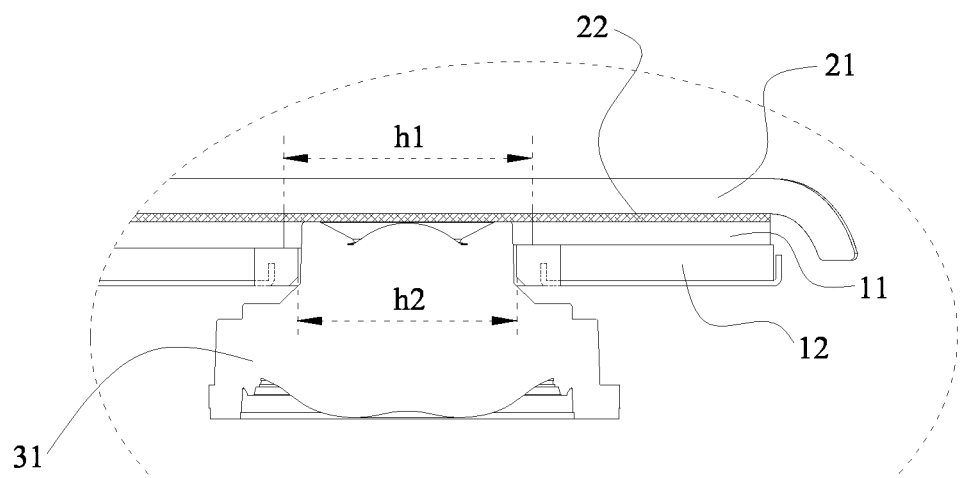
FIG. 8 is an enlarged view of part A of the display assembly in FIG. 7.

As illustrated in FIG. 7 and FIG. 8, a display assembly 20 of an electronic device 30 is further provided according to an implementation of the present disclosure. The display assembly 20 includes a cover plate 21 and the display screen 10 described above. The cover plate 21 covers the display screen 10. The cover plate 21 and the backlight module 12 are respectively disposed on two opposite surfaces of the display panel 11. The cover plate 21 can be attached to the display screen 10 via an optical transparent adhesive layer 22. It can be understood that the cover plate 21 and the display screen 10 can be connected with each other in other manners.

According to implementation, the cover plate 21 has a light transmission region. The light transmission region corresponds to the display region of the display panel 11. The corresponding means that positions of the light transmission region and the display region are substantially overlapped and areas of the light transmission region and the display region are substantially equal, so that light from the display region can pass through the light transmission region to form a picture. The cover plate 21 further has an opaque region, and the opaque region is used for shielding other components covered by the cover plate 21, where the other components do not need to be viewed by the user. The light transmission region of the cover plate 21 can be regarded as a display region of the cover plate 21. The display region of the cover plate 21 can allow the light from the display panel 11 to pass through to display a picture. A projection of the first mounting through hole h1 (defined on the display panel 11) on a axial direction of the first mounting through hole h1 falls within the display region of the cover plate 21. That is, the first mounting through hole h1 corresponds to the display region of the cover plate 21. The external light enters the first mounting through hole h1 from the display region of the cover plate 21, then passes through the second mounting through hole h2, and finally enters the camera module 31. Form the above, it can be understood that the display region of the display panel 11 can be designed to be relatively large, and thus the display region of the cover plate 21 can be designed to be relatively large accordingly, such that the user can intuitively see that the screen-to-body ratio of the electronic device 30 is increased, thereby improving the viewing experience.

Figure 9:
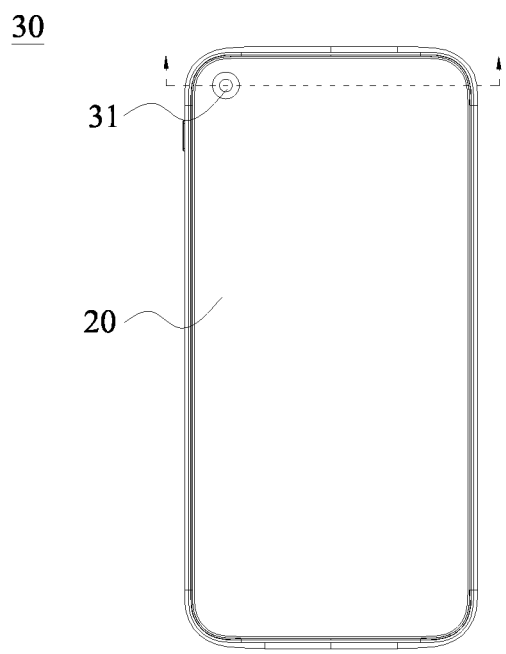
FIG. 9 is a front view of an electronic device according to implementations.
Figure 10:
FIG. 10 is a cross-sectional view of the electronic device in FIG. 9.
Figure 11:
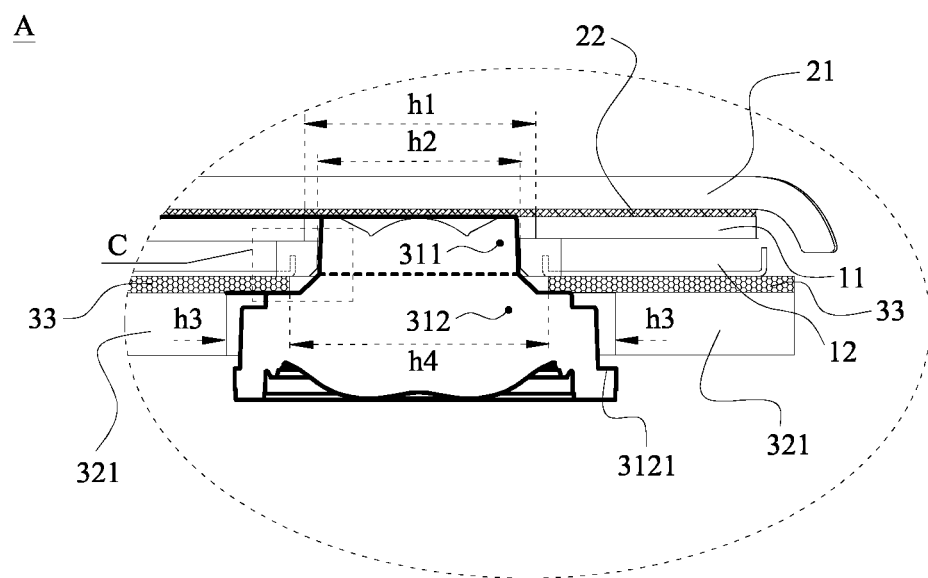
FIG. 11 is an enlarged view of part A of the electronic device in FIG. 10.

As illustrated in FIG. 9 to FIG. 11, the electronic device 30 is further provided according to an implementation of the present disclosure. The electronic device 30 includes the camera module 31 and the display assembly 20. The camera module 31 is inserted in the second mounting through hole h2, enabling external light to pass through the light transmission region and the first mounting through hole h1 to enter the camera module 31. The second mounting through hole h2 is configured to position the camera module 31. As can be seen, the electronic device 30 has a relatively large screen-to-body ratio, which improves the viewing experience. In addition, without a complicated positioning structure, the camera module 31 can be effectively positioned by directly using components of the display screen 10.

In at least one implementation, as illustrated in FIG. 10 and FIG. 11, the camera module 31 may include a lens base 312 and a lens 311 mounted on the lens base 312. In FIG. 11, to facilitate distinguishing the lens 311 from the lens base 312, a dotted line is drawn in a region in which the camera module 31 is located. The part above the dotted line can be regarded as the lens 311, and the part below the dotted line can be regarded as the lens base 312. A radial size of the lens base 312 is larger than that of the lens 311. The lens 311 is inserted in the second mounting through hole h2, so that the second mounting through hole h2 can position the lens 311. That is, the backlight module 12 is configured to position the lens 311 of the camera module 31. The lens base 312 is clamped at an edge of the second mounting through hole h2.

Figure 12:
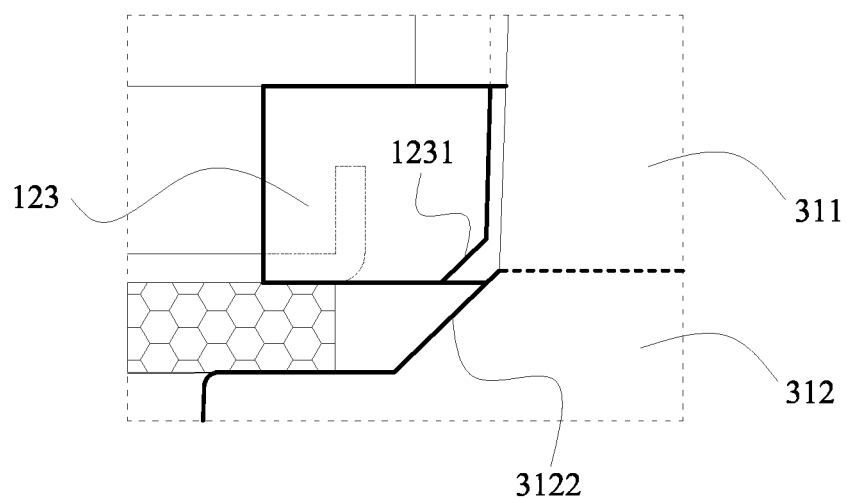
FIG. 12 is an enlarged view of part C of the electronic device in FIG. 11.

In at least one implementation, as illustrated in FIG. 11 and FIG. 12, the plastic sleeve 123 in the backlight module 12 can be used to position the camera module 31. The plastic sleeve 123 has a first guide inclined surface 1231, and a second guide inclined surface 3122 is formed at a position of the lens base 312 connected to the lens 311. The first guide inclined surface 1231 is opposite to the second guide inclined surface 3122. The two guide inclined surfaces can guide the camera module 31 during mounting the camera module 31 in the plastic sleeve 123.

In at least one implementation, as illustrated in FIG. 10 and FIG. 11, the electronic device 30 further includes a housing 32. The display assembly 20 is disposed on the housing 32. The housing 32 and the display panel 11 are respectively disposed on two opposite surfaces of the backlight module 12. The housing 32 defines a third mounting through hole h3 at a position corresponding to the second mounting through hole h2. The lens base 312 is inserted in the third mounting through hole h3 and clamped at the edge of the second mounting through hole h2. The housing 32 has a suitable structural strength and can well carry the entire display assembly 20. By defining the third mounting through hole h3 on the housing 32 and making the camera module 31 pass through the third mounting through hole h3 to be mounted on the backlight module 12, the overall thickness of the electronic device 30 may be reduced. Furthermore, during mounting the camera module 31 on the backlight module 12, by using the backlight module 12 to position the camera module 31, an assembly size chain of an assembly formed by the camera module 31 and the display assembly 20 may be shortened, thereby reducing the assembly tolerance between the camera module 31 and the display assembly 20 and ensuring the work performance of the camera module 31.

In at least one implementation, as illustrated in FIG. 10 and FIG. 11, a mounting platform 321 protrudes from a surface of the housing 32. The third mounting through hole h3 penetrates through the mounting platform 321. The lens base 312 is provided with a flange 3121 at an end away from the lens 311. The flange 3121 is clamped with the mounting platform 321 so that the flange 3121 can support the lens base 312.

In at least one implementation, as illustrated in FIG. 10 and FIG. 11, a sealing layer 33 is provided between the housing 32 and the backlight module 12. The sealing layer 33 is configured to shield light of the light source in the backlight module 12 and play a role of buffering and vibration absorption. The sealing layer 33 is made of a foam material or the like.

In at least one implementation, as illustrated in FIG. 11, the sealing layer 33 defines a fourth mounting through hole h4 at a position corresponding to the second mounting through hole h2. The fourth mounting through hole h4 is configured to allow the lens 311 to pass through. The periphery of the fourth mounting through hole h4 defined on the sealing layer is clamped between the lens base 312 and the backlight module 12, and this part of the sealing layer has a buffering and vibration absorption function to prevent the lens base 312 from shaking.

While the disclosure has been described in connection with certain embodiments, it is to be understood that the disclosure is not to be limited to the disclosed embodiments but, on the contrary, is intended to cover various included within the scope of the appended claims, which scope is to be accorded the broadest interpretation so as to encompass all such modifications and equivalent structures as is permitted under the law.

What is claimed is:

1. A display assembly of an electronic device, the electronic device further comprising a camera module, the display assembly comprising:
   a cover plate, a display panel, and a backlight module that are sequentially stacked together, wherein
   the display panel has a display region and the display region defines a first mounting through hole;
   the backlight module defines a second mounting through hole aligned with the first mounting through hole;
   the second mounting through hole is configured to position the camera module;
   the first mounting through hole serves as a channel through which external light passing through the cover plate enters the camera module;

the backlight module comprises a metal bottom cover and a plastic sleeve;

the metal bottom cover defines a first through hole, and an edge of the first through hole is connected with a first folded edge;

the plastic sleeve is connected with the first folded edge;

the plastic sleeve defines an open hole aligned with the first through hole; and the open hole of the plastic sleeve is the second mounting through hole.

2. The display assembly of claim 1, wherein the display panel is a liquid crystal panel;

the first mounting through hole has openings respectively defined on both a color filter substrate and a thin film transistor (TFT) substrate of the liquid crystal panel; and the display assembly further comprises a sealing barrel disposed between the opening defined on the color filter substrate and the opening defined on the TFT substrate, so as to enable liquid crystal to be sealed in a sealed cavity formed by the color filter substrate, the TFT substrate, and the sealing barrel, wherein an inner wall of the sealing barrel is a hole wall of the first mounting through hole.

3. The display assembly of claim 2, wherein the sealing barrel is a first black matrix.

4. The display assembly of claim 2, wherein wirings and a second black matrix are formed on the TFT substrate, wherein the second black matrix is used for covering the wirings.

5. The display assembly of claim 1, wherein the backlight module comprises a metal bottom cover, and the second mounting through hole has an opening defined on the metal bottom cover, wherein a first folded edge is formed on the periphery of the opening defined on the metal bottom cover, wherein the first folded edge is a hole wall of the second mounting through hole.

6. The display assembly of claim 5, wherein the metal bottom cover comprises a cover body, and a second folded edge is formed on the periphery of the cover body, wherein the backlight module further comprises an optical component, and the optical component is disposed between the cover body and the display panel, wherein the optical component defines a second through hole, the first folded edge is inserted in the second through hole, and the second folded edge is arranged around the periphery of the optical component.

7. The display assembly of claim 6, wherein the optical component comprises a light guide plate, and the second through hole has an opening at an edge line of the light guide plate.

8. The display assembly of claim 6, wherein the optical component comprises a light guide plate, the backlight module comprises a first light source and a second light source, and the first light source and the second light source are respectively arranged at two opposite sides of an opening of the second through hole defined on the light guide plate, so as to provide incident light to the light guide plate in opposite directions, wherein the second folded edge is arranged around the periphery of the first light source and the second light source.

9. The display assembly of claim 1, wherein the first folded edge is embedded in a side wall of the plastic sleeve to form a fixed connection between the plastic sleeve and the first folded edge.

10. The display assembly of claim 1, wherein an optical transparent adhesive layer is coated between the cover plate and the display panel.

11. The display assembly of claim 1, wherein the second mounting through hole has a smaller aperture than the first mounting through hole.

12. A display assembly of an electronic device, the electronic device further comprising a camera module, the display assembly comprising:

a cover plate, a display panel, and a backlight module that are sequentially stacked together, wherein the cover plate has a display region and the display region is configured to allow light from the display panel to pass through to present a picture;

the display panel defines a first mounting through hole, and a projection of the first mounting through hole on an axial direction of the first mounting through hole falls within the display region;

the backlight module defines a second mounting through hole aligned with the first mounting through hole, the second mounting through hole is configured to receive and position the camera module, and the first mounting through hole is configured to allow external light passing through the display region to enter the camera module;

the backlight module comprises a metal bottom cover and a plastic sleeve, the metal bottom cover defines a first through hole, and an edge of the first through hole is connected with a first folded edge; and the plastic sleeve is connected with the first folded edge, the plastic sleeve defines an open hole aligned with the first through hole, and the open hole of the plastic sleeve is the second mounting through hole.

13. An electronic device, comprising:

a camera module; and a display assembly, wherein the display assembly comprises a cover plate, a display panel, and a backlight module that are sequentially stacked together, wherein the display panel has a display region and the display region defines a first mounting through hole, and the backlight module defines a second mounting through hole aligned with the first mounting through hole;

the camera module is inserted in the second mounting through hole, enabling external light to pass through the cover plate and the first mounting through hole to enter the camera module, wherein the second mounting through hole is configured to position the camera module;

the camera module comprises a lens base and a lens mounted on the lens base, the lens is inserted in the second mounting through hole such that the second mounting through hole positions the lens, and the lens base is clamped at an edge of the second mounting through hole; and the backlight module comprises a plastic sleeve, the plastic sleeve has a first guide inclined surface, a second guide inclined surface is formed at a position of the lens base connected to the lens; and the first guide inclined surface is opposite to the second guide inclined surface.

14. The electronic device of claim 13, further comprising a housing, wherein the display assembly is disposed on the housing, and the housing and the display panel are respectively disposed on two opposite sides of the backlight module, wherein the housing defines a third mounting through hole at a position corresponding to the second mounting through hole, wherein the lens base is inserted in the third mounting through hole and clamped at the edge of the second mounting through hole.

15. The electronic device of claim 14, wherein a mounting platform protrudes from a surface of the housing, and the third mounting through hole penetrates through the mounting platform, wherein the lens base is provided with a flange at an end away from the lens, and the flange is clamped with the mounting platform.

16. The electronic device of claim 14, wherein a sealing layer is provided between the housing and the backlight module.

17. The electronic device of claim 16, wherein the sealing layer defines a fourth mounting through hole at a position corresponding to the second mounting through hole, wherein the fourth mounting through hole is configured to allow the lens to pass through, and the periphery of the fourth mounting through hole defined on the sealing layer is clamped between the lens base and the backlight module.

* * * * *